US009169774B2

(12) United States Patent
Woo et al.

(10) Patent No.: US 9,169,774 B2

(45) Date of Patent: Oct. 27, 2015

(54) VARIABLE COMPRESSION RATIO ENGINE THAT VARIES COMPRESSION RATIO

(71) Applicant: Hyundai Motor Company, Seoul (KR)

(72) Inventors: Yoonsik Woo, Whasung-Si (KR); Eun Ho Lee, Whasung-Si (KR); Seung Kook Han, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/312,332

(22) Filed: Jun. 23, 2014

(65) Prior Publication Data

US 2015/0159550 A1 Jun. 11, 2015

(30) Foreign Application Priority Data

Dec. 11, 2013 (KR) ........................ 10-2013-0154196

(51) Int. Cl.
*F16C 7/06* (2006.01)
*F02B 75/04* (2006.01)

(52) U.S. Cl.
CPC ............ *F02B 75/044* (2013.01); *F02B 75/045* (2013.01)

(58) Field of Classification Search
CPC .... F02B 75/044; F02B 75/045; F02B 75/048; F02D 15/00; F02D 15/02; F02D 15/04
USPC ............................................. 123/48 B, 78 E
See application file for complete search history.

(56) References Cited

U.S. PATENT DOCUMENTS

| | | | | | |
|---|---|---|---|---|---|
| 4,124,002 | A * | 11/1978 | Crise | ........................... | 123/78 E |
| 4,195,601 | A * | 4/1980 | Crise | ........................... | 123/78 E |
| 4,785,790 | A * | 11/1988 | Pfeffer et al. | ............... | 123/78 B |
| 7,757,584 | B2 | 7/2010 | Kubota et al. | | |
| 7,802,493 | B2 | 9/2010 | Kubota et al. | | |
| 2006/0102115 | A1* | 5/2006 | Hirano | ........................ | 123/78 B |
| 2015/0122077 | A1* | 5/2015 | Melde-Tuczai et al. | .... | 123/78 E |

FOREIGN PATENT DOCUMENTS

| | | |
|---|---|---|
| EP | 1 426 584 B1 | 10/2005 |
| KR | 1020120010881 A | 2/2012 |

* cited by examiner

*Primary Examiner* — Marguerite McMahon

(74) *Attorney, Agent, or Firm* — Morgan, Lewis & Bockius LLP

(57) ABSTRACT

A variable compression ratio engine that changes the compression ratio may include a piston disposed to be reciprocated in a cylinder by combustion, a crankshaft rotatably disposed at a predetermined distance from the piston, a crank arm with one end connected with the piston and the other end connected with the crankshaft, a connecting rod connected with the crank arm through a crankpin and with the piston through a piston pin and having an oil chamber, an eccentric cam disposed between the crankpin and the connecting rod and being off-center from the crankpin, a variable piston disposed in the oil chamber to be moved by supplied oil, and a link connecting the variable piston with the eccentric cam to rotate the eccentric cam with movement of the variable piston.

6 Claims, 3 Drawing Sheets

VARIABLE COMPRESSION RATIO ENGINE THAT VARIES COMPRESSION RATIO

CROSS-REFERENCE TO RELATED APPLICATION

The present application claims priority of Korean Patent Application Number 10-2013-0154196 filed on Dec. 11, 2013, the entire contents of which application are incorporated herein for all purposes by this reference.

BACKGROUND OF INVENTION

1. Field of Invention

The present invention relates to a variable compression ratio engine that varies a compression ratio, improving combustion efficiency, reducing noise/vibration, and increasing output by varying the compression ratio of the combustion chamber in accordance with the driving status.

2. Description of Related Art

In general, the thermal efficiency of heat engines increases when the compression ratio is high, and in spark ignition engines, the thermal efficiency increases when the ignition timing is advanced up to a predetermined level.

However, when the ignition timing is advanced with a high compression ratio in the spark ignition engines, abnormal combustion is generated and the engines may be damaged, so that there is a limit in advance of the ignition timing and accordingly the output is necessarily reduced.

A VCR (Variable Compression Ratio) apparatus is an apparatus that changes the compression ratio of a gas mixture in accordance with the operation state of an engine. According to a variable compression ratio engine that varies the compression ratio, it improve the fuel efficiency by increasing the compression ratio of a gas mixture under a low load condition and prevents knocking and improves the output by reducing the compression ratio of the gas mixture under a high load condition.

The existing variable compression ratio engines that are designed to vary the compression ratio change the compression ratio by changing the distance between the crankpins connecting the crankshaft with the pistons.

Those types of variable compression ratio engines that vary the compression ratio include a control shaft, a shaft cap, a block cover, and a control motor, in which the control motor rotates the control shaft and the driving arm on the control shaft rotates an eccentric bearing through a link. The shaft cap is needed to fix the engine block to the control shaft and is covered with the block cover, such that the number of parts increases and the weight increases accordingly.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a variable compression ratio engine that varies the compression ratio, having advantages of being able to reduce the number of parts and the weight of a variable compression ratio mechanism by controlling the compression ratio of a piston with a simple structure in comparison to the existing structures.

Various aspects of the present invention provide a variable compression ratio engine that changes the compression ratio. The engine may include a piston disposed to be reciprocated in a cylinder by combustion, a crankshaft rotatably disposed at a predetermined distance from the piston, a crank arm with one end connected with the piston and the other end connected with the crankshaft, a connecting rod connected with the crank arm through a crankpin and with the piston through a piston pin and having an oil chamber therein, an eccentric cam disposed between the crankpin and the connecting rod and being off-centered with respect to the crankpin, a variable piston disposed in the oil chamber to be moved by supplied oil, and a link connecting the variable piston with the eccentric cam to rotate the eccentric cam with movement of the variable piston.

Hydraulic pressure may be supplied to the oil chamber selectively through the crankshaft, the crank arm, the crankpin, the eccentric cam, and/or the connecting rod. The engine may further include a hydraulic pump supplying oil to the oil chamber and a control valve opening/closing an oil line from the oil pump to the oil chamber. The combustion may be performed using gasoline, diesel, or gas. The link may be connected with the variable piston by a pin and with the eccentric cam by another pin. The link may be disposed in a space defined in the connecting rod.

According to the variable compression ratio engine of the present invention that changes the compression ratio, since the eccentric cam is positioned at the portion corresponding to the crankpin, the variable piston that is moved by hydraulic pressure is disposed in the connecting rod, and the variable piston rotates the eccentric cam through the link, the compression ratio can be easily varied.

In particular, the hydraulic pressure from the oil pump is selectively supplied to the crankshaft, the crank arm, the crankpin, the eccentric cam, the connecting rod, and/or the oil chamber through the control valve, such that the height of the piston is controlled and the compression ratio can be easily varied.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
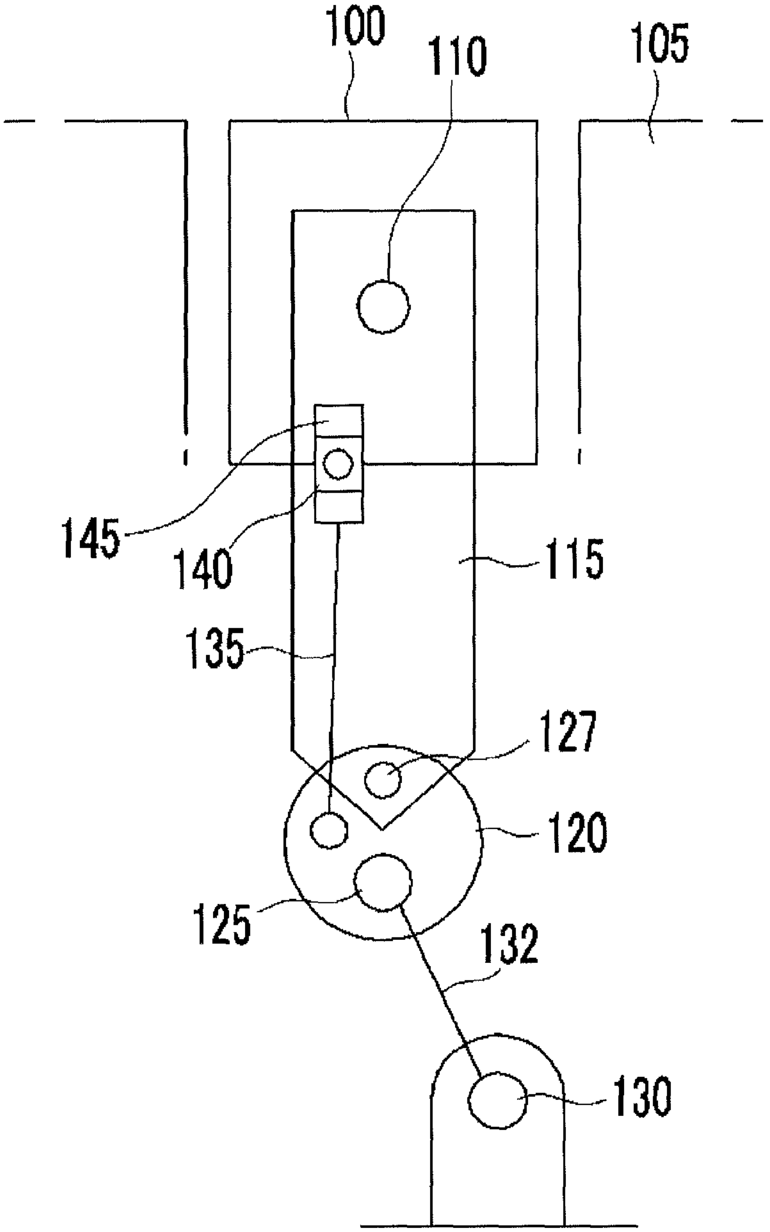
FIG. 1 is a schematic diagram showing a portion of an exemplary variable compression ratio engine that varies the compression ratio according to the present invention.

FIG. 1 is a schematic diagram showing a portion of a variable compression ratio engine that varies the compression ratio according to various embodiments of the present invention. Referring to FIG. 1, a variable compression ratio engine includes a piston 100, a piston pin 110, a cylinder 105, an oil chamber 145, a variable piston 140, a link 135, a connecting rod 115, an eccentric cam 120, a crankpin 125, a crank arm 132, and a crankshaft 130.

The cylinder 105 is disposed at the upper portion and the piston 100 is disposed to vertically or longitudinally reciprocate in the cylinder 105. The crankshaft 130 is rotatably disposed under the cylinder 105 and the crank arm 132 extends from the crankshaft 130.

The crank arm 132 is disposed rotatably around the crankshaft 130 and the eccentric cam 120 is disposed rotatably about the crankpin 125, at the end of the crank arm 132.

The connecting rod 115, which connects the piston 100 with the eccentric cam 120, is connected with the piston 100 through the piston pin 110 and with the eccentric cam 120 through the cam pin 127.

In various embodiments of the present invention, a predetermined distance is defined between the cam pin 127 and the crankpin 125, the oil chamber 145 is vertically or longitudinally formed in the connecting rod 115, between the piston pin 110 and the cam pin 127, and a variable piston 140 is disposed in the oil chamber 145.

The link 135 connects the variable piston 140 with the eccentric pin 120 and rotates the eccentric cam 120 about the crankpin 125 with the vertical or longitudinal movement of the variable piston pin 140.

In various embodiments of the present invention, as hydraulic pressure is supplied to the oil chamber 145, the variable piston 140 moves down, the link 135 rotates the eccentric cam 120 counterclockwise about the crankpin 125, and the eccentric cam 120 moves down the connecting rod 115 and the piston 100 through the cam pin 127. Therefore, the compression ratio of the engine increases.

In various embodiments of the present invention, when the supply of the hydraulic pressure to the oil chamber 145 is stopped, the variable piston 140 moves up, the link 135 rotates the eccentric cam 120 clockwise about the crankpin 125, and the eccentric cam 120 moves up the connecting rod 115 and the piston 100 through the cam pin 127. Therefore, the compression ratio of the engine decreases.

Figure 2:
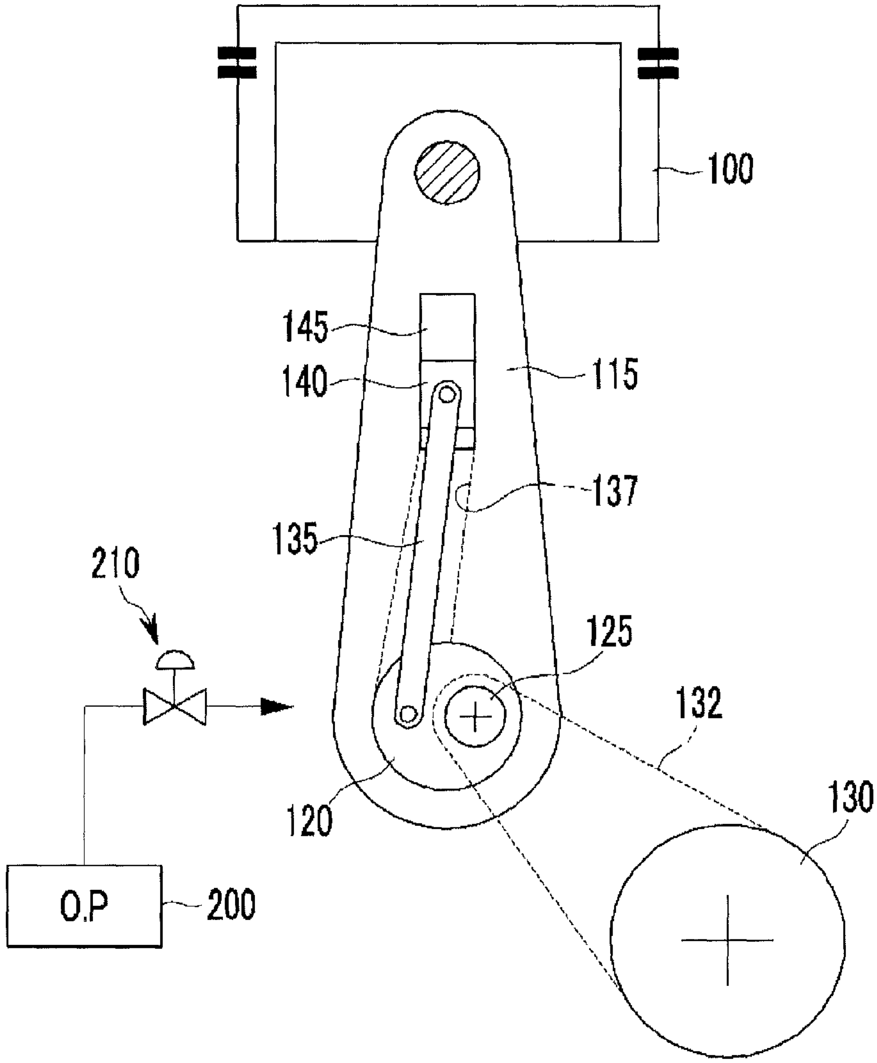
FIG. 2 is a side view showing a portion of an exemplary engine with a compression ratio varying mechanism according to the present invention.

FIG. 2 is a side view showing a portion of an engine with a compression ratio varying mechanism according to various embodiments of the present invention. Referring to FIG. 2, the engine includes a piston 100, a connecting rod 115, an oil chamber 145, a variable piston 140, a link 135, a link space 137, an eccentric cam 120, a crankpin 125, a crank arm 132, a crankshaft 130, a control valve 210, and an oil pump 200.

The eccentric cam 120 passes through the lower portion of the connecting rod 115 and the crankpin 125 passes through an end portion of the crank arm 132 and the eccentric cam 120. The eccentric cam 120 is off-center from the crankpin 125 and moves the connecting rod 115 up or down in accordance with the rotation position.

The variable piston 140 is disposed in the oil chamber 145, the link 135 connects the variable piston 140 with the eccentric cam 120, and the link 135 rotates the eccentric cam 120 about the crankpin 125 with the vertical movement of the variable piston 140.

The link space 137 where the link 135 is disposed is defined in the connecting rod 115 and the link 135 moves up/down through the link space 137.

In various embodiments of the present invention, an oil pump 200 that pumps hydraulic pressure to the oil chamber 145 is provided and a control valve 210 is disposed in the oil line from the oil pump 200 to the oil chamber 145.

The control valve 210, which is controlled by a controller, controls the compression ratio by adjusting the height of the piston 100 by opening or closing the oil line in accordance with the operation conditions.

Figure 3:
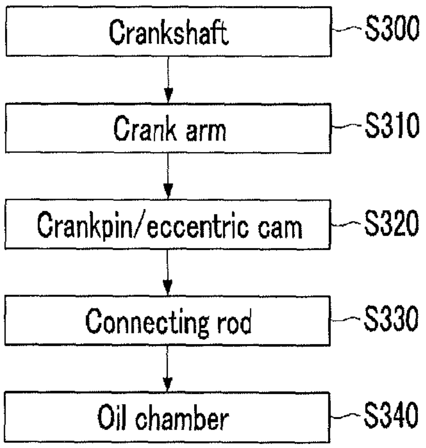
FIG. 3 is a flowchart illustrating a transmission path of hydraulic pressure in an exemplary engine with a compression ratio varying mechanism according to the present invention.

FIG. 3 is a flowchart illustrating a transmission path of hydraulic pressure in an engine with a compression ratio varying mechanism according to various embodiments of the present invention. Referring to FIG. 3, hydraulic pressure is supplied from the oil pump 200 to the crankshaft 130 through a cylinder block in S300. In S310, hydraulic pressure is supplied from the crankshaft 130 to the crank arm 132.

In S320, hydraulic pressure is supplied to the crankpin 125 and the eccentric cam 120 from the crank arm 132. In S330, hydraulic pressure is supplied from the eccentric cam 120 to the connecting rod 115. In S340, hydraulic pressure is supplied from the connecting rod 115 to the oil chamber 145.

In various embodiments of the present invention, the eccentric cam 120 is positioned at the portion corresponding to the crankpin 125, the variable piston 140 that is moved by hydraulic pressure is disposed in the connecting rod 115, and the variable piston 140 rotates the eccentric cam 120 through the link 135, such that the compression ratio can be easily varied.

In particular, the hydraulic pressure from the oil pump 200 is selectively supplied to the crankshaft 130, the crank arm 132, the crankpin 125, the eccentric cam 120, the connecting rod 115, and/or the oil chamber 145 through the control valve 210, such that the height of the piston 100 is controlled and the compression ratio can be easily varied.

In various embodiments of the present invention, the variable compression ratio engine is available for all of fuel that is burned, particularly internal combustion engines that burn gasoline, diesel, or gas with air.

For convenience in explanation and accurate definition in the appended claims, the terms "upper" or "lower", "up" or "down", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable compression ratio engine that changes a compression ratio, the engine comprising:

a piston disposed to be reciprocated in a cylinder by combustion;

a crankshaft rotatably disposed at a predetermined distance from the piston;

a crank arm with one end connected with the piston and the other end connected with the crankshaft;

a connecting rod connected with the crank arm through a crankpin and with the piston through a piston pin and having an oil chamber therein;

an eccentric cam disposed between the crankpin and the connecting rod and being off-centered with respect to the crankpin;

a variable piston disposed in the oil chamber to be moved by supplied oil; and a link connecting the variable piston with the eccentric cam to rotate the eccentric cam with movement of the variable piston.

2. The engine of claim 1, wherein hydraulic pressure is supplied to the oil chamber selectively through the crankshaft, the crank arm, the crankpin, the eccentric cam, and/or the connecting rod.

3. The engine of claim 2, further comprising:

a hydraulic pump supplying oil to the oil chamber; and a control valve opening/closing an oil line from the oil pump to the oil chamber.

4. The engine of claim 2, wherein the combustion is performed using gasoline, diesel, or gas.

5. The engine of claim 2, wherein the link is connected with the variable piston by a pin and with the eccentric cam by another pin.

6. The engine of claim 2, wherein the link is disposed in a space defined in the connecting rod.

* * * * *